(12) United States Patent
Minami

(10) Patent No.: US 11,049,253 B2
(45) Date of Patent: Jun. 29, 2021

(54) DYNAMIC ANALYSIS DEVICE AND RECORDING MEDIUM

(71) Applicant: Konica Minolta, Inc., Tokyo (JP)

(72) Inventor: Hirotake Minami, Fuchu (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/804,723

(22) Filed: Feb. 28, 2020

(65) Prior Publication Data

US 2020/0286236 A1 Sep. 10, 2020

(30) Foreign Application Priority Data

Mar. 6, 2019 (JP) .............................. JP2019-040228

(51) Int. Cl.
*G06K 9/00* (2006.01)
*G06T 7/00* (2017.01)

(52) U.S. Cl.
CPC .. *G06T 7/0016* (2013.01); *G06T 2207/10016* (2013.01); *G06T 2207/10116* (2013.01); *G06T 2207/30048* (2013.01); *G06T 2207/30061* (2013.01)

(58) Field of Classification Search
None
See application file for complete search history.

(56) References Cited

U.S. PATENT DOCUMENTS

| | | | | |
|---|---|---|---|---|
| 2010/0208957 | A1* | 8/2010 | Chen | G06T 7/0016 382/128 |
| 2012/0300904 | A1* | 11/2012 | Shimada | A61B 6/542 378/62 |
| 2015/0269726 | A1* | 9/2015 | Shimamura | G06T 7/0016 382/128 |
| 2015/0317793 | A1* | 11/2015 | Zhang | G06T 5/50 382/130 |
| 2016/0210747 | A1* | 7/2016 | Hay | A61B 5/7435 |
| 2017/0323440 | A1* | 11/2017 | Tsunomori | G06K 9/46 |
| 2018/0137634 | A1* | 5/2018 | Fujiwara | G06T 7/00 |
| 2018/0260955 | A1* | 9/2018 | Matsutani | G06T 7/38 |
| 2019/0154785 | A1* | 5/2019 | Zhou | G01R 33/56316 |
| 2021/0052228 | A1* | 2/2021 | Abe | A61B 6/00 |

FOREIGN PATENT DOCUMENTS

JP 2005151099 A 6/2005

* cited by examiner

*Primary Examiner* — Atiba O Fitzpatrick
(74) *Attorney, Agent, or Firm* — Lucas & Mercanti, LLP

(57) ABSTRACT

A dynamic analysis device including a hardware processor that generates, from each of a first chest dynamic image and a second chest dynamic image generated by radiographing dynamics of a chest at different times, a plurality of pieces of waveform information including at least waveform information indicating a respiratory state and waveform information indicating a heartbeat state; selects, from the second chest dynamic image, a comparative image to be compared with a reference image included in the first chest dynamic image, according to the generated plurality of pieces of waveform information; and subjects the reference image and the comparative image to a comparison analysis process.

11 Claims, 5 Drawing Sheets

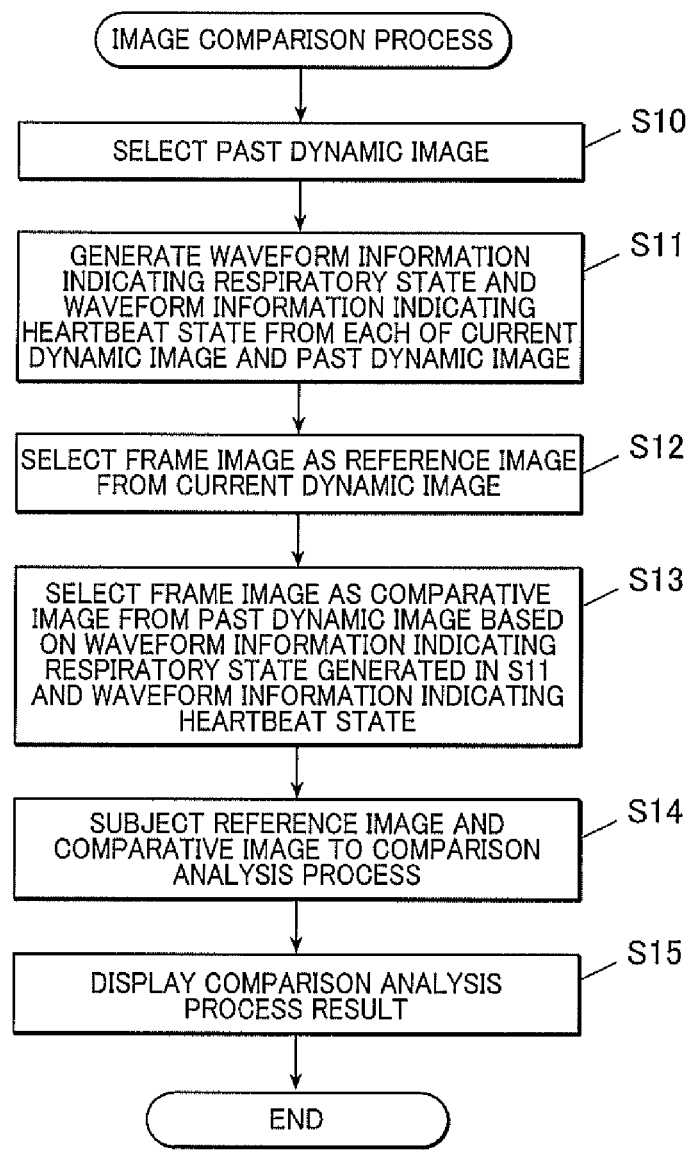

CURRENT: RADIOGRAPHING DATE A

PAST: RADIOGRAPHING DATE B

CURRENT: RADIOGRAPHING DATE A

PAST: RADIOGRAPHING DATE B

DYNAMIC ANALYSIS DEVICE AND RECORDING MEDIUM

CROSS-REFERENCE TO RELATED APPLICATIONS

The entire disclosure of Japanese Patent Application No. 2019-040228 filed on Mar. 6, 2019 is incorporated herein by reference in its entirety.

BACKGROUND

Technological Field

The present invention relates to a dynamic analysis device and a recording medium.

Description of the Related Art

In recent years, dynamic images obtained by radiographing a chest with respiration are expected to provide new diagnostic information. However, when dynamic images taken at different times are compared, the problem arises that proper reading by comparison cannot be achieved because of the difference between the cycles and phases of the subject at the time of the imaging.

For example, for a chest front image captured at a medical test or the like, a temporal difference process is known as a technique by which the difference between images to be compared can be easily recognized. If this technique is simply applied to dynamic images, an artifact occurs in the difference image due to the difference between the respiratory cycles or respiratory phases.

In a technique (see, for example, JP 2005-151099A) which has already been proposed to solve this problem, a temporal difference process is performed on the same respiratory phase frame related to two tests.

SUMMARY

However, in an image of a chest, the periodically moving organs (structures) are not limited to the lungs, and include, for example, a heart moving with heartbeat and an aortic arch. Since these structures have cycle characteristics different from those of lungs, with only synchronization of the respiratory phase, artifacts associated with the movements of these structures may occur in the results or the like of the temporal difference process. In particular, since the heart region two-dimensionally occupies a wide area in a chest image, the interpretation efficiency and the interpretation accuracy are greatly affected.

An object of the present invention is to enable accurate comparison between dynamic images of a chest radiographed at different times.

To achieve at least one of the abovementioned objects, according to an aspect of the present invention, a dynamic analysis device reflecting one aspect of the present invention comprises: a hardware processor that generates, from each of a first chest dynamic image and a second chest dynamic image generated by radiographing dynamics of a chest at different times, a plurality of pieces of waveform information including at least waveform information indicating a respiratory state and waveform information indicating a heartbeat state; selects, from the second chest dynamic image, a comparative image to be compared with a reference image included in the first chest dynamic image, according to the generated plurality of pieces of waveform information; and subjects the reference image and the comparative image to a comparison analysis process.

To achieve at least one of the abovementioned objects, according to another aspect of the present invention, a non-transitory recording medium that stores a computer-readable program, reflecting one aspect of the present invention causes a computer to:

generate, from each of a first chest dynamic image and a second chest dynamic image generated by radiographing dynamics of a chest at different times, a plurality of pieces of waveform information including at least waveform information indicating a respiratory state and waveform information indicating a heartbeat state;

select, from the second chest dynamic image, a comparative image to be compared with a reference image included in the first chest dynamic image, according to the plurality of pieces of waveform information generated by the waveform information generator; and subject the reference image and the comparative image to a comparison analysis process.

BRIEF DESCRIPTION OF THE DRAWINGS

The advantages and features provided by one or more embodiments of the invention will become more fully understood from the detailed description given hereinbelow and the appended drawings which are given by way of illustration only, and thus are no intended as a definition of the limits of the present invention, wherein:

FIG. 3 is a flowchart of an image comparison process executed by a controller for the diagnostic console shown in FIG. 1 in the first embodiment;

DETAILED DESCRIPTION OF THE EMBODIMENTS

Embodiments related to a dynamic analysis device and a recording medium of the present invention will be described below with reference to the accompanying drawings. However, the scope of the invention is not limited to the disclosed embodiments.

[Configuration of Dynamic Analysis System 100]

First, the configuration of this embodiment will be described.

Figure 1:
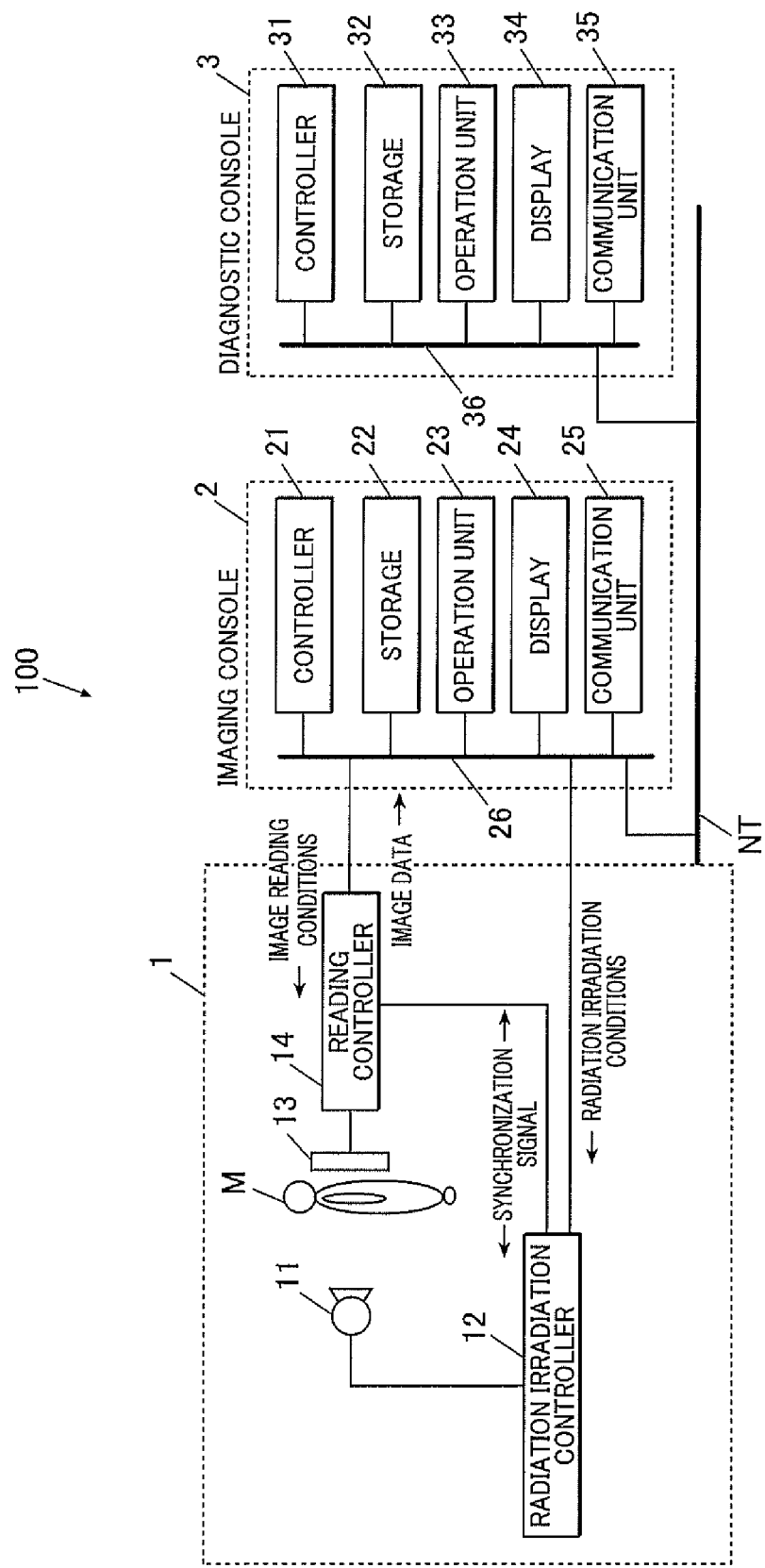
FIG. 1 is a diagram showing the overall configuration of a dynamic analysis system according to an embodiment of the present invention.

FIG. 1 shows the overall configuration of a dynamic analysis system 100 according to this embodiment.

As shown in FIG. 1, in the dynamic analysis system 100, an imaging device 1 and an imaging console 2 are connected through a communication cable or the like, and the imaging console 2 and the diagnostic console 3 are connected through a communication network NT such as a local area network (LAN). The devices constituting the dynamic analysis system 100 conform to the digital image and communications in medicine (DICOM) standard, and communication between the devices is performed in accordance with DICOM.

[Configuration of Imaging Device 1]

The imaging device 1 is an imaging unit that images dynamics having a cycle, such as a change in the form of expansion and contraction of the lungs caused by respiratory movement, and heartbeat. Dynamic imaging refers to obtaining a plurality of images indicating dynamics of a subject by irradiating the subject with pulsed X-rays or other radiation at predetermined time intervals (pulse irradiation), or irradiating the subject continuously at a low dose rate (continuous irradiation). A series of images obtained by dynamic imaging is referred to as a dynamic image. Each of the plurality of images constituting the dynamic image is referred to as a frame image. In the following embodiments, a case where dynamic imaging of a chest is performed by pulse irradiation will be described as an example.

A radiation source 11 is disposed in a position facing a radiation detector 13 with a subject M (examinee) interposed therebetween, and irradiates the subject M with radiation (X-rays) under the control by a radiation irradiation controller 12.

The radiation irradiation controller 12 is connected to the imaging console 2 and performs radiography, controlling the radiation source 11 according to the radiation irradiation conditions input from the imaging console 2. The radiation irradiation conditions input from the imaging console 2 include, for example, a pulse rate, a pulse width, a pulse interval, the number of imaging frames accompanied by a single imaging operation, an X-ray tube current value, an X-ray tube voltage value, and the type of an additional filter. A pulse rate is the number of times of radiation irradiation per second, and matches the frame rate which will be described later. A pulse width is a radiation irradiation time for one radiation irradiation operation. A pulse interval is the time from the start of one radiation irradiation operation to the start of the next radiation irradiation, and matches a frame interval which will be described later.

The radiation detector 13 is a semiconductor image sensor such as an FPD. The FPD has a glass substrate, for example, and a plurality of detection elements (pixels) are arranged in a matrix in a predetermined position on the substrate. The detection elements detects radiation emitted from the radiation source 11 and passing through at least the subject M according to its intensity, and converts the detected radiation to an electric signal and accumulates it. Each pixel includes a switching unit such as a thin film transistor (TFT). The FPD is classified into the indirect conversion type FPD that converts X-rays into electric signals using a photoelectric conversion element via a scintillator, and the direct conversion type FPD that converts X-rays directly into electric signals, which are both applicable.

The radiation detector 13 faces the radiation source 11 with the subject M therebetween.

The reading controller 14 is connected to the imaging console 2. The reading controller 14 controls the switching unit of each pixel of the radiation detector 13 according to the image reading conditions, which are input from the imaging console 2, in order to make sequential switching for reading the electric signal accumulated in each pixel and thus read the electric signals accumulated in the radiation detector 13, thereby acquiring image data. This image data is a frame image. The reading controller 14 then outputs the acquired frame image to the imaging console 2. The image reading conditions include, for example, a frame rate, a frame interval, a pixel size, and an image size (matrix size). A frame rate is the number of frame images acquired per second, and matches a pulse rate. A frame interval is the time from the start of one operation for frame image acquisition to the start of the next operation for frame image acquisition, and matches a pulse interval.

Here, the radiation irradiation controller 12 and the reading controller 14 are connected to each other, and exchange synchronization signals so that their radiation irradiation operations and image reading operations can be synchronized.

[Configuration of Imaging Console 2]

The imaging console 2 outputs radiation irradiation conditions and image reading conditions to the imaging device 1 to control radiography and radiographic image reading operation performed in the imaging device 1, and displays a dynamic image acquired through the imaging device 1, so that whether the image is suitable for checking or diagnosis of positioning by a radiographer, such as a radiation technologist, is confirmed.

As shown in FIG. 1, the imaging console 2 includes a controller 21, a storage 22, an operation unit 23, a display 24, and a communication unit 25, and they are connected via a bus 26.

The controller 21 includes a central processing unit (CPU) and a random access memory (RAM). The CPU of the controller 21 reads, according to the operation given through the operation unit 23, system programs and various process programs stored in the storage 22 and expands them in the RAM, executes various processes, including an imaging control process, which will be described later, according to the expanded programs, and centrally controls the operations of the components of the imaging console 2 and the radiation irradiating operation and reading operation in the imaging device 1.

The storage 22 is a nonvolatile semiconductor memory, a hard disk, or the like. The storage 22 stores data such as various programs executed by the controller 21, parameters needed for execution of processes using programs, or processing results. For example, the storage 22 stores programs for executing the imaging control process shown in FIG. 2. Further, the storage 22 stores the radiation irradiation conditions and the image reading conditions in association with the test target site (here, the chest). These programs are stored in the form of computer-readable program codes, and the controller 21 sequentially executes operations according to the program codes.

The operation unit 23 includes a keyboard having cursor keys, numeric keys, various function keys, and the like, and a pointing device such as a mouse, and outputs an instruction signal, which is input through a key operation on the keyboard or a mouse operation, to the controller 21. The operation unit 23 may include a touch panel on the screen of the display 24. In this case, the operation unit 23 outputs an instruction signal, which is input via the touch panel, to the controller 21.

The display 24 includes a monitor, such as a liquid crystal display (LCD) or a cathode ray tube (CRT), and displays an input instruction from the operation unit 23, data, and the like according to an instruction indicated by a display signal input from the controller 21.

The communication unit 25 includes a LAN adapter, a modem, and a terminal adapter (TA), and controls data exchange with the devices connected to the communication network NT.

[Configuration of Diagnostic Console 3]

The diagnostic console 3 is a device for acquiring dynamic images from the imaging console 2 and displaying the acquired dynamic images and the analysis results related to the dynamic images, to support a doctor's diagnosis.

As shown in FIG. 1, the diagnostic console 3 includes a controller 31 (hardware processor), a storage 32, an operation unit 33, a display 34, and a communication unit 35, and they are connected via a bus 36.

The controller 31 includes a CPU and a RAM. The CPU of the controller 31 reads, according to the operation given through the operation unit 33, system programs and various process programs stored in the storage 32 and expands them in the RAM, executes various processes, including an image comparison process, which will be described later, according to the expanded programs, and centrally controls the operations of the components of the diagnostic console 3.

The storage 32 is a nonvolatile semiconductor memory, a hard disk, or the like. The storage 32 stores data such as various programs, including a program for executing the image comparison process in the controller 31, parameters needed for execution of processes using programs, or processing results. These various programs are stored in the form of computer-readable program codes, and the controller 31 sequentially executes operations according to the program codes.

In the storage 32, dynamic images captured in the past are stored in association with patient information (for example, patient ID, patient name, height, weight, age, and gender), and test information (for example, test ID, test date, test target site (here, the chest).

The operation unit 33 includes a keyboard having cursor keys, numeric keys, various function keys, and the like, and a pointing device such as a mouse, and outputs an instruction signal, which is input through a user's key operation on the keyboard or a user's mouse operation, to the controller 31. The operation unit 33 may include a touch panel on the screen of the display 34. In this case, the operation unit 33 outputs an instruction signal, which is input via the touch panel, to the controller 31.

The display 34 is a monitor, such as an LCD or a CRT, and displays various images according to an instruction indicated by a display signal input from the controller 31.

The communication unit 35 includes a LAN adapter, a modem, and a TA, and controls data exchange with the devices connected to the communication network NT.

[Operation of Dynamic Analysis System 100]

The operation of the dynamic analysis system 100 according to this embodiment will now be described.

(Operations of Imaging Device 1 and Imaging Console 2)

The imaging operation by the imaging device 1 and the imaging console 2 will be first described.

Figure 2:
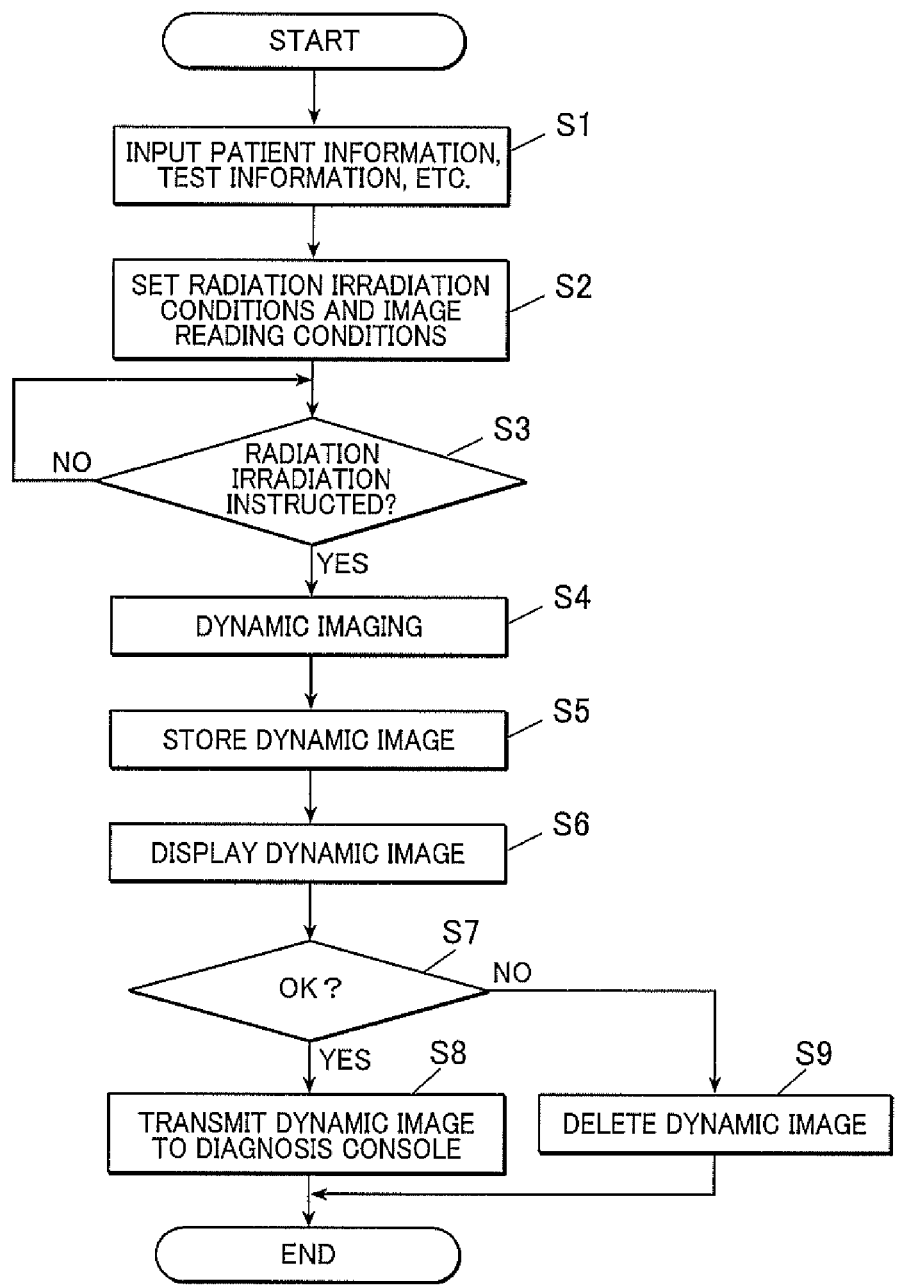
FIG. 2 is a flowchart of an imaging control process executed by a controller for the imaging console shown in FIG. 1.

FIG. 2 shows an imaging control process executed in the controller 21 of the imaging console 2. The imaging control process is executed by cooperation of the controller 21 and a program stored in the storage 22.

First, the operation unit 23 of the imaging console 2 is operated by the radiographer to input patient information and test information related to an examinee (subject M) (Step S1).

Next, the radiation irradiation conditions are read from the storage 22 and set in the radiation irradiation controller 12, and the image reading conditions are read from the storage 22 and set in the reading controller 14 (Step S2).

Next, an instruction for radiation irradiation by the operation on the operation unit 23 is put on standby (Step S3). Here, the radiographer performs positioning by locating the subject M between the radiation source 11 and the radiation detector 13. Further, an instruction related to a respiratory state is given to the examinee (subject M). To be specific, the examinee (subject M) is instructed to relax to encourage the subject to quietly breathe. Upon completion of preparation for imaging, the operation unit 23 is operated to input an instruction to irradiate with radiation.

If the instruction to irradiate with radiation is input from the operation unit 23 (Step S3; YES), an instruction to start imaging is output to the radiation irradiation controller 12 and the reading controller 14, and dynamic imaging is started (Step S4). In other words, radiation is emitted from the radiation source 11 at pulse intervals set in the radiation irradiation controller 12, and a frame image is acquired by the radiation detector 13.

After a predetermined number of frames are captured, the controller 21 outputs an instruction to end the imaging to the radiation irradiation controller 12 and the reading controller 14, thereby stopping the imaging operation. The number of captured frames is the number of images with which at least one respiratory cycle can be captured.

The frame images obtained by the imaging are sequentially input to the imaging console 2 and stored in the storage 22 in association with numbers indicating the imaging order (frame numbers) (Step S5), and displayed on the display 24 (Step S6). The radiographer checks the positioning or the like according to the displayed dynamic image, and determines whether an image suitable for diagnosis has been obtained by the imaging (imaging OK) or whether re-imaging is necessary (imaging NG). The operation unit 23 is then operated to input a determination result.

If the determination result indicating imaging OK is input through a predetermined operation on the operation unit 23 (Step S7; YES), an identification ID for identifying a dynamic image, patient information, test information, radiation irradiation conditions, image reading conditions, a number indicating the imaging order (frame number), and other information are assigned to each of a series of frame images acquired by dynamic imaging (for example, written, in DICOM format, to the header region of image data), and transmitted to the diagnostic console 3 via the communication unit 25 (Step S8). This process then ends. In contrast, when the determination result indicating imaging NG is input through a predetermined operation on the operation unit 23 (Step S7; NO), the series of frame images stored in the storage 22 is deleted (Step S9), and this process then ends. In this case, re-imaging is required.

(Operation of Diagnostic Console 3)

Next, the operation of the diagnostic console 3 will be described.

In the diagnostic console 3, upon reception of a series of frame images of the dynamic image of the chest from the imaging console 2 via the communication unit 35, the image comparison process shown in FIG. 3 is performed through the cooperation between the controller 31 and the program stored in the storage 32.

The flow of the image comparison process will be described below with reference to FIG. 3.

First, a past dynamic image to be compared with the received dynamic image is selected (Step S10).

In Step S10, for example, a list of past dynamic images of the subject M stored in the storage 32 is displayed on the display 34, and the dynamic image that the user desires may be selected from the displayed dynamic images by the operation unit 33, or the controller 31 may automatically select, for example, the dynamic image with the latest test date from the past dynamic images of the subject M stored in the storage 32. Alternatively, the controller 31 may automatically select a dynamic image that satisfies a predetermined condition.

Note that a received dynamic image is referred to as a current dynamic image (first chest dynamic image), and a dynamic image to be compared with the current dynamic image is referred to as a past dynamic image (second chest dynamic image). A frame image to be interpreted, which is obtained from a current dynamic image, is referred to as a reference image, and a frame image to be compared with the reference image, which is obtained from a past dynamic image, is referred to as a comparative image.

Next, waveform information indicating a respiratory state and waveform information indicating a heartbeat state are generated from the current dynamic image and the past dynamic image, respectively (Step S11).

In Step S11, for example, waveform information indicating temporal changes in a predetermined structure moving with respiration is generated as waveform information indicating a respiratory state. Further, for example, waveform information indicating temporal changes in a predetermined structure moving with heartbeat is generated as waveform information indicating a heartbeat state.

Waveform information indicating temporal changes in a predetermined structure (here, the lung field or diaphragm) moving with respiratory movement is obtained by, for example, extracting, for a current dynamic image and a past dynamic image, a lung field region from each frame image, and arranging the areas and heights of the extracted lung field regions, the positions of the diaphragms, and the like in chronological order to form a graph. The lung field region may be extracted using any known method. For example, a threshold is determined from the histogram of the signal value of each pixel by discriminant analysis, and a region having a signal with a value higher than the threshold is primarily extracted as a lung field region candidate. Edge detection is then performed near the boundary of the primarily extracted lung field region candidate and a point with a maximum edge is extracted along the boundary in a small area near the boundary so that the boundary of the lung field region can be extracted. The lung field area can be determined, for example, by multiplying the number of pixels in the extracted lung field region by the pixel size. The height of the lung field region can be determined, for example, by calculating the distance between the highest position (apex) and the lowest position in the lung field region. The position of the diaphragm can be determined by, for example, extracting a lower edge portion of the lung field region as a diaphragm boundary, setting a reference point at a certain x coordinate position of the diaphragm boundary, and obtaining the y coordinate of the set reference point.

Waveform information indicating temporal changes in a predetermined structure (here, heart) moving with heartbeat is obtained by, for example, extracting, for a current dynamic image and a past dynamic image, a heart region from each frame image, and arranging the areas, widths, or the like of the extracted heart regions in chronological order to form a graph. The contour of the heart region can be extracted, for example, using a known method such as a heart contour determination method described in JP 2796381A. The area of the heart region can be determined, for example, by multiplying the number of pixels in the extracted heart region by the pixel size. The width of the heart region can be determined, for example, by determining the largest width in the heart region.

Apart from that, for example, waveform information indicating temporal changes in a pixel value in the lung field region may be generated as waveform information indicating a respiratory state. For example, waveform information indicating temporal changes in a pixel value in the heart region may be generated as waveform information indicating a heartbeat state.

Figure 4A:
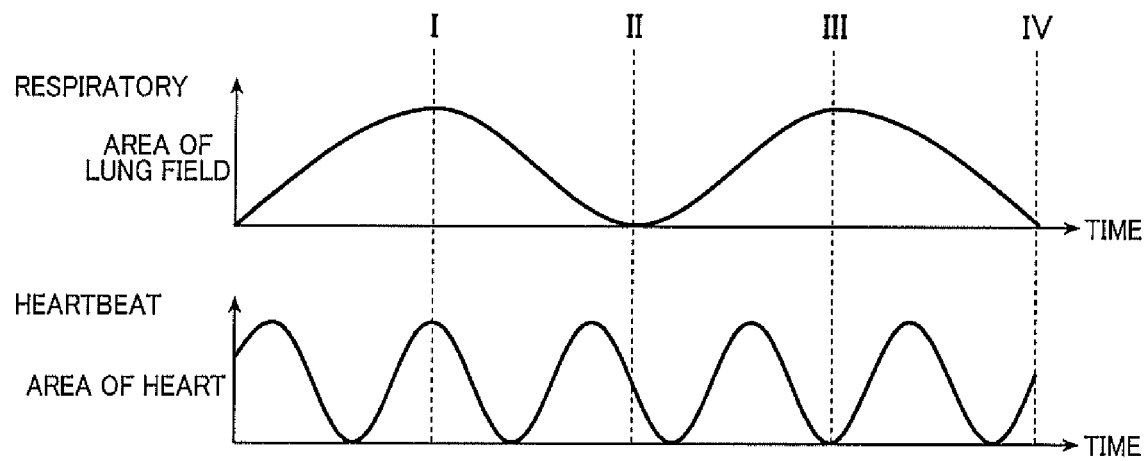
FIG. 4A consists of the upper graph showing an example of waveform information indicating a respiratory state and generated from a current dynamic image, and the lower graph showing an example of waveform information indicating a heartbeat state and generated from a current dynamic image.

The upper graph of FIG. 4A shows an example of waveform information indicating a respiratory state and generated from a current dynamic image. The lower graph of FIG. 4A shows an example of waveform information indicating a heartbeat state and generated from a current dynamic image.

Figure 4B:
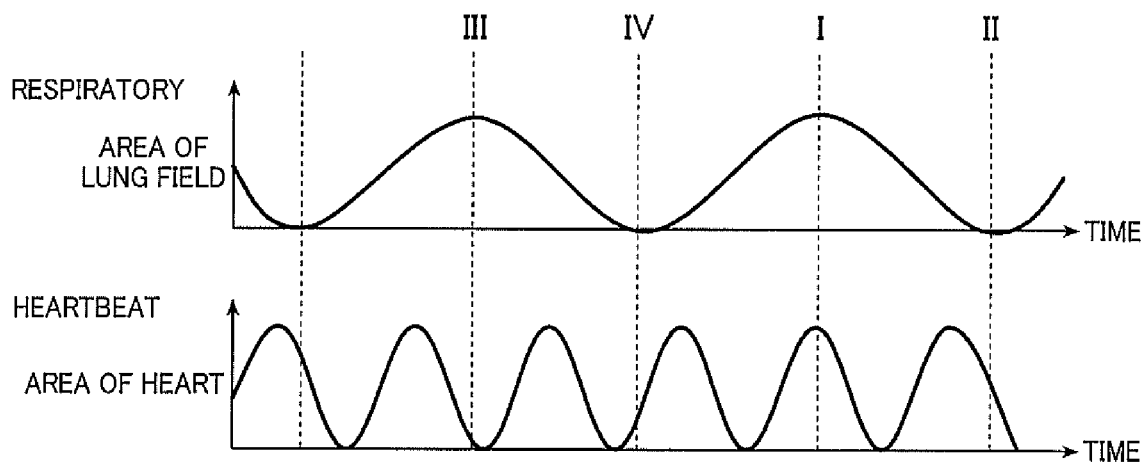
FIG. 4B consists of the upper graph showing an example of waveform information indicating a respiratory state and generated from a past dynamic image, and the lower graph showing an example of waveform information indicating a heartbeat state and generated from a past dynamic image.

The upper graph of FIG. 4B shows an example of waveform information indicating a respiratory state and generated from a past dynamic image. The lower graph of FIG. 4B shows an example of waveform information indicating a heartbeat state and generated from a past dynamic image.

Figure 5A:
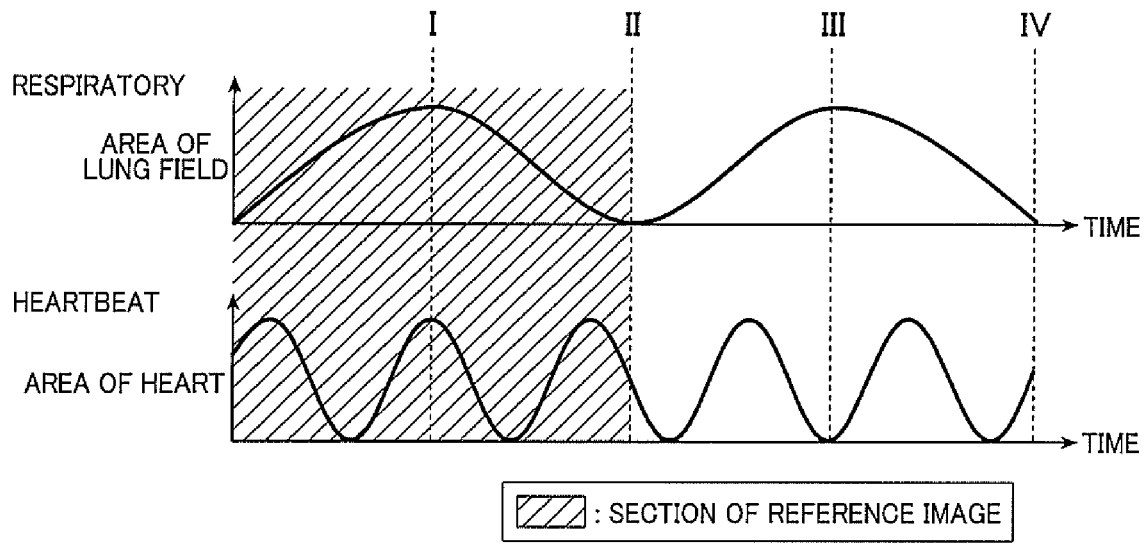
FIG. 5A is a diagram showing an example of a section of a reference image observed when the reference image is a frame image of an arbitrary section defined on a time-series basis.
Figure 5B:
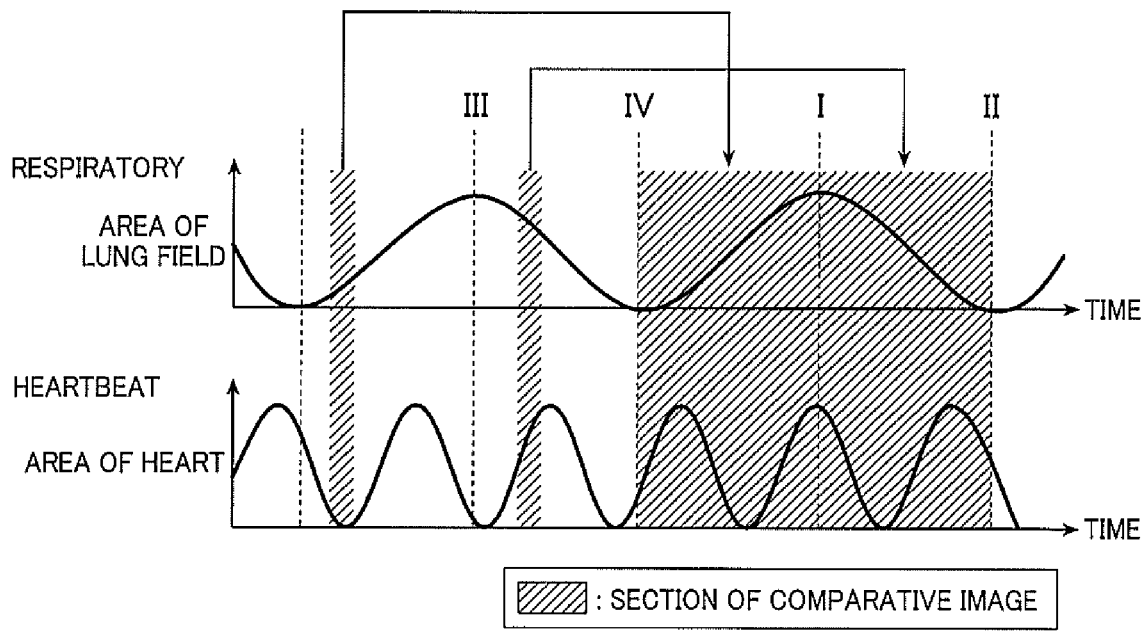
FIG. 5B is a diagram showing a section of a comparative image to be compared with the reference image shown in FIG. 5A.

In FIG. 4B, the time (frame image) at which the respiratory and heartbeat phases are the most similar to that of each of I to IV in FIG. 4A is indicated by the corresponding symbol (the same applies to FIGS. 5A and 5B).

Next, a reference image to undergo comparison interpretation is selected from the current dynamic image (Step S12).

The reference image may be a single frame image included in the current dynamic image, or may be a plurality of frame images included in an arbitrary section, which is defined on the time series, in the current dynamic image. The selection of the reference image may be performed automatically or manually.

In the case where reference image selection is made manually, for example, the respective frame images of the current dynamic image are displayed side by side on the display 34, and one of the displayed frame images selected by user's operation on the operation unit 33, or a plurality of frame images in an arbitrary section defined along the time direction are selected as reference images.

In the case where reference image selection is made automatically and one frame image is selected as a reference image, for example, and a temporal difference process is performed between a reference image and a comparative image in the subsequent comparison analysis process, a lung field region is an observation target; thus, the frame image at the maximal inspiratory level at which the lung field region is maximized and the phase ((III) in FIG. 4A) at which the heart region is minimized is selected as a reference image. In the case where a cardiothoracic ratio measurement process is performed on the reference image and the comparative image in the subsequent comparison analysis process, for example, the frame image at the maximum inspiratory level at which the lung field region is maximized in size (the heartbeat phase does not matter) is selected as a reference image.

In the case where reference image selection is made automatically and a plurality of frame images in an arbitrary section defined on a time-series basis are selected as a reference image, for example, a frame image section of a predetermined cycle is automatically selected as the reference image. Alternatively, for example, a plurality of frame images in a predetermined phase section, for example, from the maximum expiration level to the maximum inspiration level may be automatically selected as a reference image.

Next, a frame image as a comparative image is selected from the past dynamic image based on the waveform information indicating the respiratory state generated from the current dynamic image and the past dynamic image and the waveform information indicating the heartbeat state (Step S13).

For example, in the case where the reference image is one frame image, based on the waveform information acquired in Step S11, the frame image in which the respiratory phase and the heartbeat phase are the most similar to those in the reference image selected in Step S12 from the past dynamic images is selected as a comparative image.

It is preferable that a frame image having the same respiratory state (expiratory period and inspiratory period) and heartbeat state (diastolic period and systolic period) as the reference image be selected as a comparative image.

For example, in the case where the reference image is a plurality of frame images in an arbitrary section defined on a time-series basis, based on the waveform information generated in Step S11, sections of the frame image that has the most similar respiratory phase and heartbeat phase to those of a frame image included in the section (which may be a part or whole of the section) of, for example, the reference image selected from the past dynamic image in Step S12 are combined to yield a frame image determined as a comparative image (see FIGS. 5A and 5B). For example, if the number of frame images of the comparative image is less than the number of frame images of the reference image due to, for example, a difference in the cycles of the waveform calculated from the current dynamic image and the cycle of the waveform calculated from the past dynamic image, the frame images of the reference image may be reduced, or the frame images of the comparative image may be interpolated by an interpolation process, such as bilinear interpolation or bicubic interpolation, so that the number of frame images of the reference image and the number of frame images of the comparative image match.

The comparative image preferably has the same respiratory state (expiratory period and inspiratory period) and heartbeat state (diastolic period and systolic period) as the corresponding frame image of the reference image.

Next, the reference image and the comparative image are subjected to a comparison analysis process (Step S14).

The comparison analysis process is an analysis process for assisting the comparative interpretation of the reference image and the comparative image, and is represented by, for example, a temporal difference process for generating a difference image between the reference image and the comparative image, and a cardiothoracic ratio measurement process for measuring the cardiothoracic ratios of the reference image and the comparative image. In the case where the reference image and the comparative image are sections, the temporal difference process and the cardiothoracic ratio measurement process are executed for each corresponding frame image of the reference image and the comparative image.

Next, the process result of the comparison analysis process is displayed on the display 34 (Step S15), and the image comparison process then ends.

As described above, the controller 31 of the diagnostic console 3 generates the waveform information indicating the respiratory state and the waveform information indicating the heartbeat state from each of the current chest dynamic image and the past chest dynamic image, and based on a generated plurality of pieces of waveform information, a comparative image to be compared with a reference image included in the current chest dynamic image is selected from the past chest dynamic image, and the reference image and the comparative image are subjected to a comparison analysis process.

This avoids an artifact in a structure, which moves with respiration and heartbeat, in the comparative analysis process results, or the failure of obtaining accurate analysis results due to movement of the structure caused by respiration and heartbeat, thereby leading to accurate comparison between the reference image and the comparative image in chest dynamic images obtained by radiography at different times. Consequently, the diagnostic performance and the efficiency of interpretation can be enhanced.

Note that the description in the above embodiment is a preferred example of the present invention, and is not necessarily the case.

For example, the aforementioned embodiment exemplifies the case where the current dynamic image and the past dynamic image of the same examinee are compared. However, even when the current dynamic image of the examinee and the dynamic image of another examinee (for example, an image of a patient with a typical case) are compared, the present invention is applicable.

In addition, a reference image is first selected from the current dynamic image, and a comparative image is selected from the past dynamic image according to the selected reference image in the aforementioned embodiment; alternatively, a reference image may be selected from the past dynamic image and a comparative image may be selected from the current dynamic image according to the selected reference image.

Moreover, the waveform information indicating a respiratory state is generated from a current dynamic image and a past dynamic image, and the waveform information indicating a heartbeat state is generated from the current dynamic image and the past dynamic image, and a comparative image to be compared with a reference image is determined according to the generated waveform information in the aforementioned embodiment; alternatively, the waveform information indicating the respiratory state and the waveform information indicating the heartbeat state may be generated together with the waveform information indicating dynamics other than the respiration and the heartbeat, and the comparative image to be compared with the reference image may be determined based on the generated waveform information.

Further, for example, the above description exemplifies the case where a hard disk, a non-volatile semiconductor memory, or the like is used as a computer-readable medium of programs according to the present invention, which is not necessarily the case. Other applicable computer-readable media include a portable recording medium such as a CD-ROM. Apart from that, a carrier wave can also be used as a medium for providing the data of the programs according to the present invention via a communication line.

Aside from that, the detailed configuration and detailed operation of the dynamic analysis device can be modified as appropriate without departing from the spirit of the present invention.

Although several embodiments of the present invention have been described, the scope of the present invention is not limited to the aforementioned embodiments, and includes the scope of the invention described in the claims and the equivalents thereof.

Although embodiments of the present invention have been described and illustrated in detail, the disclosed embodiments are made for purposes of illustration and example only and not limitation. The scope of the present invention should be interpreted by terms of the appended claims

What is claimed is:

1. A dynamic analysis device comprising a hardware processor that generates, from each of a first chest dynamic image and a second chest dynamic image generated by radiographing dynamics of a chest at different times, a plurality of pieces of waveform information including at least waveform information indicating a respiratory state and waveform information indicating a heartbeat state; selects, from the second chest dynamic image, a comparative image to be compared with a reference image included in the first chest dynamic image, according to the generated plurality of pieces of waveform information; and subjects the reference image and the comparative image to a comparison analysis process.

2. The dynamic analysis device according to claim 1, comprising a display that shows a result of the comparison analysis process.

3. The dynamic analysis device according to claim 1, wherein the hardware processor involves a temporal difference process or a cardiothoracic ratio measurement process.

4. The dynamic analysis device according to claim 1, wherein, when the reference image is a single frame image, the hardware processor selects, from the second chest dynamic image, a frame image that has the most similar respiratory phase and heartbeat phase to those of the reference image, according to the generated plurality of pieces of waveform information; and determines the frame image as the comparative image.

5. The dynamic analysis device according to claim 1, wherein, when the reference image is a plurality of frame images in an arbitrary section defined on a time-series basis, the hardware processor determines, according to the generated plurality of pieces of waveform information, the comparative image by combining sections of a frame image selected from the second chest dynamic image, the sections having the most similar respiratory phase and heartbeat phase to those of a frame image included in a section of the reference image.

6. The dynamic analysis device according to claim 5, wherein, when the reference image and the determined comparative image have different numbers of frame images, the hardware processor reduces the number of frame images of the reference image or the comparative image, or performs interpolation by an interpolation process.

7. The dynamic analysis device according to claim 1, wherein the hardware processor selects the reference image from the first chest dynamic image.

8. The dynamic analysis device according to claim 1, wherein the hardware processor selects the second chest dynamic image to be compared with the first chest dynamic image.

9. The dynamic analysis device according to claim 1, wherein waveform information indicating the respiratory state is waveform information indicating a temporal change in a position of a diaphragm, an area or height of a lung field region.

10. The dynamic analysis device according to claim 1, wherein waveform information indicating the heartbeat state is waveform information indicating a temporal change in an area or width of a heart region.

11. A non-transitory recording medium that stores a computer-readable program for causing a computer to:
generate, from each of a first chest dynamic image and a second chest dynamic image generated by radiographing dynamics of a chest at different times, a plurality of pieces of waveform information including at least waveform information indicating a respiratory state and waveform information indicating a heartbeat state;
select, from the second chest dynamic image, a comparative image to be compared with a reference image included in the first chest dynamic image, according to the plurality of pieces of waveform information generated by the waveform information generator; and
subject the reference image and the comparative image to a comparison analysis process.

* * * * *